(12) United States Patent
Gallet et al.

(10) Patent No.: US 9,404,420 B2
(45) Date of Patent: Aug. 2, 2016

(54) DEVICE FOR RECOVERING LUBRICATING OIL FROM AN EPICYCLIC REDUCTION GEAR

(71) Applicant: SNECMA, Paris (FR)

(72) Inventors: Francois Gallet, Moissy-Cramayel (FR); Boris Briantais, Moissy-Cramayel (FR); Jean-Pierre Serey, Moissy-Cramayel (FR); Alexandre Tan-Kim, Moissy-Cramayel (FR)

(73) Assignee: SNECMA, Paris (FR)

( * ) Notice: Subject to any disclaimer, the term of this patent is extended or adjusted under 35 U.S.C. 154(b) by 20 days.

(21) Appl. No.: 14/379,840

(22) PCT Filed: Feb. 22, 2013

(86) PCT No.: PCT/FR2013/050361
§ 371 (c)(1),
(2) Date: Aug. 20, 2014

(87) PCT Pub. No.: WO2013/124590
PCT Pub. Date: Aug. 29, 2013

(65) Prior Publication Data
US 2015/0300255 A1    Oct. 22, 2015

(30) Foreign Application Priority Data

Feb. 23, 2012 (FR) .................................... 12 51655
Feb. 23, 2012 (FR) .................................... 12 51656

(51) Int. Cl.
*F16H 57/04* (2010.01)
*F02C 7/06* (2006.01)
(Continued)

(52) U.S. Cl.
CPC . *F02C 7/06* (2013.01); *F01D 25/18* (2013.01); *F02C 7/36* (2013.01); *F16H 57/0409* (2013.01); *F16H 57/0423* (2013.01);
(Continued)

(58) Field of Classification Search
CPC .............. F16H 57/042; F16H 57/0421; F16H 57/0427; F16H 57/0423; F16H 57/0424
See application file for complete search history.

(56) References Cited

U.S. PATENT DOCUMENTS 5,107,676 A    4/1992    Hadaway et al.
5,411,116 A    5/1995    Kish et al.
(Continued)

FOREIGN PATENT DOCUMENTS

JP    2008 267420    11/2008
WO    2011 142235    11/2011

OTHER PUBLICATIONS

International Search Report Issued Jun. 4, 2013 in PCT/FR13/050361 Filed Feb. 22, 2013.

*Primary Examiner* — Derek D Knight
*Assistant Examiner* — David Morris
(74) *Attorney, Agent, or Firm* — Oblon, McClelland, Maier & Neustadt, L.L.P.

(57) ABSTRACT

An epicyclic reduction gear, including a planetary gear movable in rotation about an axis of rotation, planet pinions driven by the planetary gear and movable in rotation about axes of planet gears carried by a planet carrier, the planet pinions rolling on a fixed ring gear and the planet carrier being axially positioned laterally relative to the ring gear, the gear formed by the planet pinions and the ring gear being formed to axially eject lubricating oil thereof after use. The planet carrier includes a radial extension positioned facing the gear and forming a mechanism for guiding the oil to a radial end thereof to be ejected from there by centrifugation.

8 Claims, 7 Drawing Sheets

(51) Int. Cl.
  *F02C 7/36* (2006.01)
  *F01D 25/18* (2006.01)
(52) U.S. Cl.
  CPC ....... *F16H 57/0427* (2013.01); *F16H 57/0456* (2013.01); *F16H 57/0479* (2013.01); *F16H 57/0486* (2013.01); *F05D 2260/40311* (2013.01); *F16H 57/0421* (2013.01); *Y02T 50/671* (2013.01)

(56) References Cited

U.S. PATENT DOCUMENTS 8,205,432 B2 * 6/2012 Sheridan ................... F02C 7/36
  60/226.1
2013/0045828 A1 2/2013 Morita et al.

* cited by examiner

DEVICE FOR RECOVERING LUBRICATING OIL FROM AN EPICYCLIC REDUCTION GEAR

The field of the present invention is that of aeronautic propulsion and more specifically that of bypass turbojet engines having a high bypass ratio, or turbofans.

Modern turbine engines are conventionally produced in the form of an assembly of modules which may comprise fixed portions and movable portions. A module is defined as being a sub-assembly of a turbine engine which has geometric characteristics, in the region of the interfaces thereof with the adjacent modules, which are sufficiently precise to allow it to be supplied individually and which has been subjected to a specific balancing operation when it comprises rotating components. The assembly of the modules allows a complete engine to be produced, with the balancing operations and pairing of components at the interface being reduced to the maximum extent.

Turbofans comprise a plurality of compressor stages, in particular a low-pressure compressor (BP) and a high-pressure compressor (HP) which belong to the main body of the engine. Upstream of the low-pressure compressor there is arranged a wheel having large movable blades, or fan, which supplies both the primary flow which passes through the BP and HP compressors and the cold flow, or secondary flow, which is directed directly towards a cold flow pipe, referred to as the secondary pipe. The fan is driven by the rotary shaft of the BP body and rotates generally at the same speed. However, it may be advantageous to rotate the fan at a rotation speed which is lower than that of the BP shaft, in particular when said fan is very large, in order to better adapt it aerodynamically. To this end a reduction gear is arranged between the BP shaft and a fan shaft which carries the fan. The fan, the fan shaft and the reduction gear are generally part of the same module, known as the fan module.

One of the problems encountered with reduction gears on turbofans is that they require significant flow rates of oil, which may be from 6 to 7000 l/h at take-off, in order to ensure their lubrication and cooling of the pinions and bearings thereof. In order to limit the losses resulting from churning, it is necessary to move the oil precisely to the desired locations, then to remove it as soon as the lubrication action thereof has been carried out. The types of reduction gears used include epicyclic train reduction gears which have the advantage of providing significant reduction rates of the rotation speed, with reduced spatial requirements. On the other hand, they have the disadvantage of having planet pinions which move by rotating about the rotation axis of the drive shaft of the reduction gear. It is therefore necessary to envisage devices in order, on the one hand, to move the oil, which originates from a main reservoir and a lubrication pump which are located at a fixed reference location, onto these pinions which are located at a movable reference location and, on the other hand, to recover this oil after it has passed over the pinions and to return it to the fixed reference location. It is particularly advantageous to control the recovery of such flows, by, inter alia, preventing this oil from accumulating in the housing and becoming heated by means of churning.

On the reduction gears which are currently in use, the oil is generally introduced in the region of the pinions and is collected towards the bottom of the housing where it falls naturally by gravity. A simple solution for recovering the oil also exists in reduction gears with an epicyclic train where the ring gear of the train can be moved in rotation. The rotation thereof allows oil to be ejected by means of centrifuging, towards a gutter where it is recovered then returned to the main reservoir via a recovery pipe.

Such a solution cannot be applied to a reduction gear having an epicyclic train in which the outer ring gear is fixed. The oil would not be ejected and could accumulate in the reduction gear with a churning action which would bring about losses of performance and excessive sizing of the oil circuit in order to take into account the heating produced.

An object of the present invention is to overcome these disadvantages by providing a device for recovering oil from a turbojet engine reduction gear, which is compatible with a reduction gear having movable pinions and a fixed outer ring gear.

To this end, the invention relates to a reduction gear having an epicyclic train, comprising a sun pinion which can be moved in rotation about a rotation axis, satellite type planet pinions which are driven by the sun pinion and which can be moved in rotation about planet shafts which are carried by a planet carrier, said satellite type planet pinions travelling on a fixed ring gear and said planet carrier being axially positioned laterally relative to said ring gear, the gear pair formed by the satellite planet pinions and the ring gear being shaped to axially eject the lubrication oil thereof after use, characterised in that the planet carrier comprises a surface portion which is positioned opposite the gear pair and which forms a means for guiding and redirecting said oil, from the axial direction thereof to the radial direction thereof, for ejection by means of centrifuging at the end thereof.

The planet carrier thus ensures the recovery of the lubrication oil which is circulating at the movable reference location which is connected to the reduction gear and ejects said oil from these movable portions, using the rotation movement thereof, in order to return said oil to the fixed reference location at which the reduction gear is installed. The redirection of the oil from its axial direction to a radial direction allows full use to be made of the action of the centrifugal force generated by the rotation of the components of the reduction gear and thus allows the capacity of the lubrication system for collecting oil projected by the pinions to be improved.

Advantageously, said radial extension is in the form of a partial torus. Such a shape ensures both the function of recovery and that of ejecting the lubrication oil.

Preferably, the radial extension carries rotating blades which are arranged in a regular manner on the circumference of the planet carrier, extending inside the torus. Said blades are intended to facilitate the ejection of the oil, preventing it from accumulating at the upper portion of the torus.

More preferably, the rotating blades are, in radial cross-section with respect to the common rotation axis, curved inwards in the opposite direction to the rotation direction of the planet carrier.

In a specific embodiment, the reduction gear further comprises at least one fixed oil collection gutter which extends radially beyond said planet carrier and which is positioned axially opposite said radial extension.

Preferably, the portion of said gutter which is located opposite said radial extension is of conical form.

More preferably, the conical portion carries fixed blades which are distributed in a regular manner over the circumference of said conical portion and which have in radial cross-section, with respect to the common rotation axis, an inwardly curved shape which extends in the opposite direction to the rotation direction of the planet carrier.

The invention further relates to a fan module of a bypass turbojet engine which comprises a fan shaft which is driven by a reduction gear as described above and a bypass turbojet engine which comprises such a fan module.

In a specific embodiment, the fan module comprises at least one support component for the fan shaft by means of two bearings, the support component comprising a first fixing flange of said module which is shaped so as to be attached to a second flange which is carried by a structural component of the turbojet engine, and the reduction gear is carried by a support housing which comprises a flange which is shaped so as to be able to be fixed to said second structural flange of the turbojet engine, in order to be able to mount said reduction gear on said fan module before or at the same time as the fan module is assembled on at least one other module of the turbojet engine.

The invention will be better understood and other aims, details, features and advantages thereof will be appear more clearly from the following detailed explanatory description of an embodiment of the invention given purely by way of non-limiting example, with reference to the accompanying schematic drawings.

Figure 1:
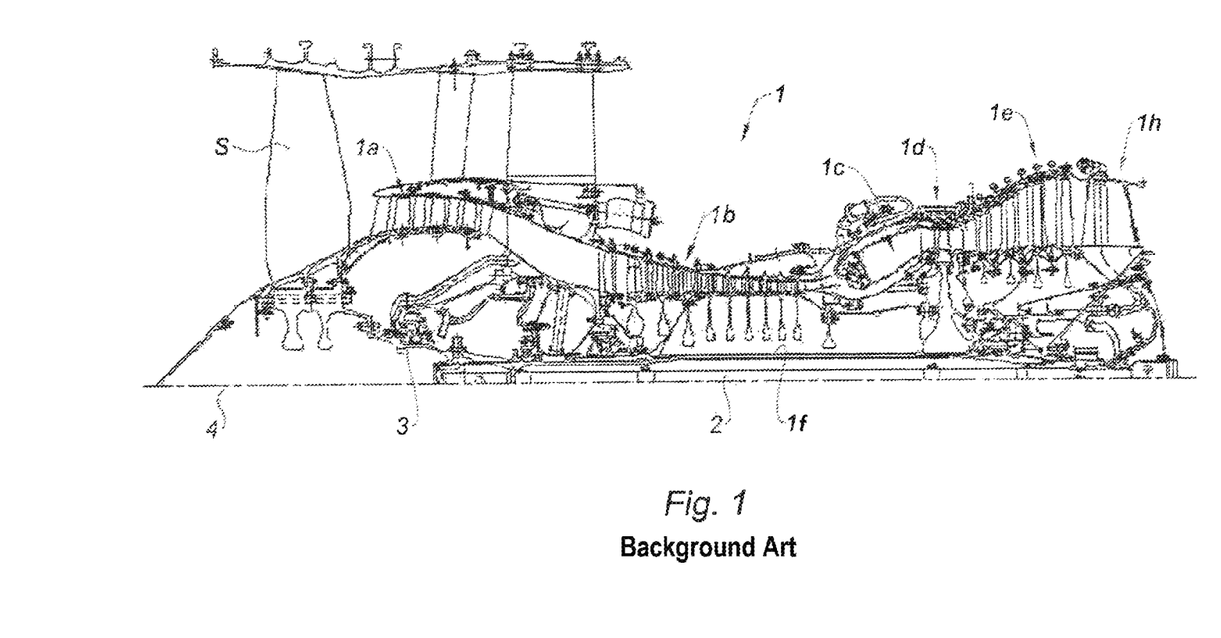
FIG. 1 is a general view of a bypass turbojet engine having a high bypass ratio.

With reference to FIG. 1, a turbojet engine 1 is shown which comprises, in conventional manner, a fan S, a low-pressure compressor 1a, a high-pressure compressor 1b, a combustion chamber 1c, a high-pressure turbine 1d, a low-pressure turbine 1e and an exhaust pipe 1h. The high-pressure compressor 1b and the high-pressure turbine 1d are connected by means of a high-pressure shaft if and form therewith a high-pressure body (HP). The low-pressure compressor 1a and the low-pressure turbine 1e are connected by means of a low-pressure shaft 2 and form therewith a low-pressure body (BP).

In the configuration illustrated which relates to a conventional turbofan, without a reduction gear, the disc on which the blades of the fan S are mounted is driven by a fan shaft 3, or BP journal, which is itself directly driven by the low-pressure shaft 2. In the invention illustrated in FIGS. 2 to 7, the fan shaft 3 is driven by the low-pressure shaft 2 via a reduction gear 10 with an epicyclic train.

Figure 2:
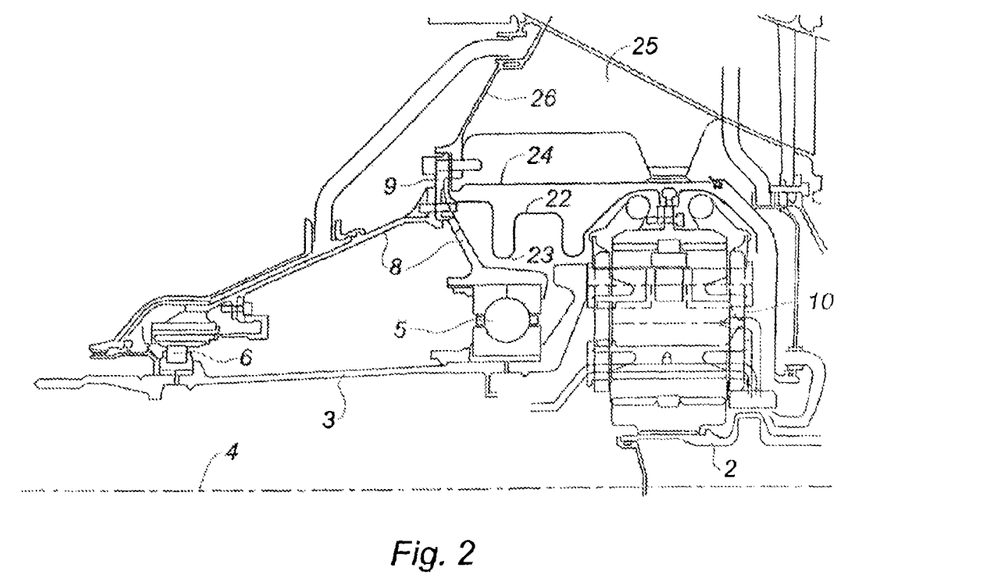
FIG. 2 is a detailed view showing the incorporation, in a turbofan, of a gear with an epicyclic train for reducing the rotation speed of the fan shaft.

FIG. 2 shows the positioning of the reduction gear 10 in the front portion of the turbojet engine 1. The blades of the fan S are carried by the fan shaft 3 which is connected to the structure of the engine via a ball bearing 5 which transmits the thrust forces, and a roller bearing 6 which allows longitudinal expansion of the fan shaft. The bearing members of these two bearings are fixed to one or more components which form a support 8 for the fan shaft 3 which is fixed to the structure of the turbojet engine in the region of a support flange of the fan module 9. The fan shaft 3 which belongs to the fan module with the support component 8, the blades of the fan S and the two bearings 5 and 6, is driven via the downstream end thereof by the planet carrier 13 of the reduction gear 10. The low-pressure shaft 2 is connected to the sun pinion 11 of the reduction gear 10 via the grooves 7 thereof, as explained below with reference to FIG. 4.

The reduction gear 10 is fixed, via closure and support flanges 20 which extend radially from the ring gear of the epicyclic train, to one of the ends of a support housing 22 which thus ensures that the reduction gear is held in position on the fan shaft 3 and is positioned relative to the low-pressure shaft 2. The other end of the support housing 22 is fixed to the structure of the turbojet engine, on a flange 26 for connection to the fan module, which extends radially from a structural component of the turbojet engine, or an abutment housing 25. The support housing 22 is cylindrical and comprises on the longitudinal extension thereof axial undulations 23, two of which are illustrated, in order to provide a degree of radial flexibility and to ensure flexible assembly on the reduction gear. Such a degree of freedom prevents it from being flanged to the structure and from being subjected to significant stresses during vibrations or movements by means of expansion of the various elements which constitute the turbojet engine.

A clearance J is left circumferentially around the ring gear in order to allow the reduction gear to move radially without interfering with the structure of the turbojet engine. It is sized to allow the reduction gear to float in its housing under normal conditions and to be used up only in the event of loss or breakage of a blade of the fan. To this end, opposite the external ring gear 14 of the reduction gear 10, there is arranged the structural abutment housing 25 which comprises ribs against which the ring gear may be in abutment if it moves radially by a value greater than the clearance J. This abutment housing 25 absorbs the forces generated by the abutment of the ring gear 14 in the event of breakage or loss of a blade of the fan. Between the support housing 22 and the abutment housing 25 is a pressurising housing 24 for the chamber of the reduction gear 10 in order to facilitate the ejection of the lubrication oil thereof, as will be explained below.

Figure 3:
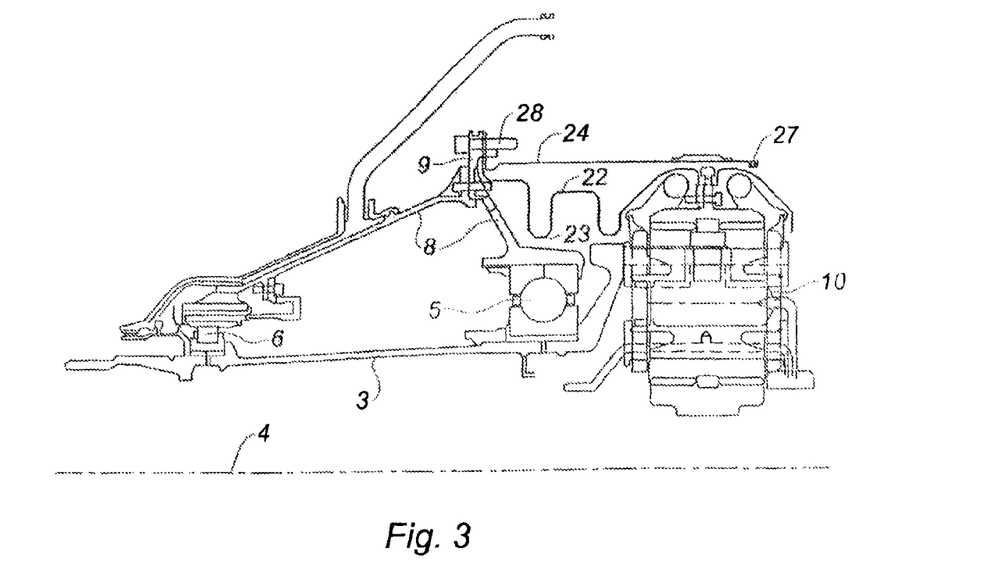
FIG. 3 is a view of the fan module of the turbofan of FIG. 1.

FIG. 3 shows the various elements of the fan module, which are assembled in the region of a fixing means 28, of the bolt type, on the flange 26 of the abutment housing 25. This bolt 28 is intended to fix to the fixing flange 26 both the components 8 for supporting the bearings 5 and 6 which belong to the fan module, and consequently the fan S, and the support housing 22 and pressurising housing 24 of the reduction gear 10. It will be noted that the assembly of the reduction gear 10 on the structure of the fan module is carried out from the downstream to the upstream direction of the turbojet engine, the positioning thereof being ensured by centering members 17 on the fan shaft 3 as will be explained below and by means of cooperation of the support housing 22 thereof with the flange 26 and the fixing means 28. Finally, the pressurising housing 24 which is cylindrical and which surrounds the reduction gear may be positioned, also from a downstream direction, until the upstream end thereof cooperates with the fixing flange 26 and the fixing means 28. This pressurising housing 24 is intended to create a chamber around the reduction gear which is at a pressure greater than that which surrounds it, the chamber being placed in a reduced pressure state by means of a pump for drawing oil from the reduction gear 10. The branching of the oil recovery circuit from the reduction gear to this outer chamber allows the oil to be better ejected from the reduction gear and thus prevents the phenomena of churning. The pressurising housing thus comprises at the downstream end thereof a groove in which an O-ring 27 is positioned in order to ensure the sealing of this chamber after the fan module has been mounted on the structure of the engine.

Figure 4:
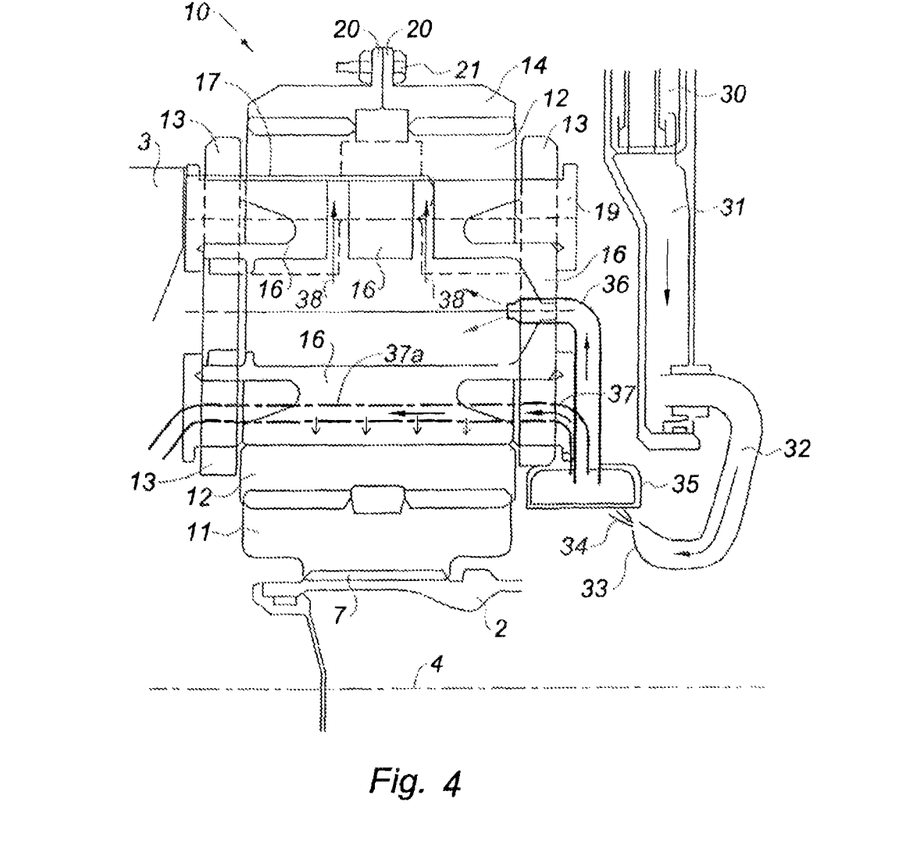
FIG. 4 is a detailed view of the reduction gear of FIG. 2, provided with a lubrication system.

FIG. 4 is a radial half-section of the upper portion of the reduction gear 10, the lower portion being located symmetrically relative to the rotation axis 4 of the turbine engine, which appears at the bottom of the figure. The reduction gear 10 is externally enclosed in the ring gear 14 thereof, which cannot be moved in rotation and which is fixed to the structure of the engine in the region of the closure and fixing flanges 20 thereof. The ring gear 14 is produced in two portions in order to allow the positioning of all the elements which constitute the reduction gear and these two portions are attached to each other by a series of assembly bolts 21, in the region of the flanges 20 which extend radially from the ring gear. The corresponding end of the support housing 22 is also fixed to the closure flanges 20 by means of assembly bolts 21.

The reduction gear engages, on the one hand, on grooves 7 of the low-pressure shaft 2 by means of engagement pinions of the sun pinion 11 of the epicyclic train and, on the other hand, on the fan shaft 3 which is fitted to the planet carrier 13 of this same epicyclic train. Conventionally, the sun pinion 11, of which the rotation axis merges with the axis 4 of the turbine engine, drives a series of satellite type planet pinions 12 which are distributed in a regular manner over the circumference of the reduction gear. These satellite planet pinions 12 also rotate about the axis 4 of the turbine engine, travelling on the ring gear 14 which is fixed to the structure of the turbine engine via the support housing 22. At the centre of each satellite planet pinion 12, there is positioned a planet shaft 16 which is connected to a planet carrier 13, the satellite planet pinion 12 rotating freely about this shaft by means of a bearing which may be a smooth bearing, as illustrated in FIG. 4, or comprise a roller bearing in alternative configurations. The rotation of the satellite planet pinions about their planet shaft 16, owing to the cooperation of their pinions with those of the ring gear 14, brings about the rotation of the planet carrier 13 about the axis 4 and consequently that of the fan shaft 3 which is connected thereto, at a rotation speed which is lower than that of the low-pressure shaft 2.

The driving of the fan shaft 3 by the satellite carrier 13 is ensured by a series of centering members 17 which are distributed in a regular manner over the circumference of the reduction gear, which extend from the fan shaft and which are introduced in holes formed in the planet carrier. The planet carrier 13 extends symmetrically on either side of the reduction gear in order to close the assembly and form a chamber in which a lubrication function can be carried out. Bushings 19 complete the closure of this chamber, closing it in the region of the planet shafts 16 at each side of the reduction gear.

Figure 5:
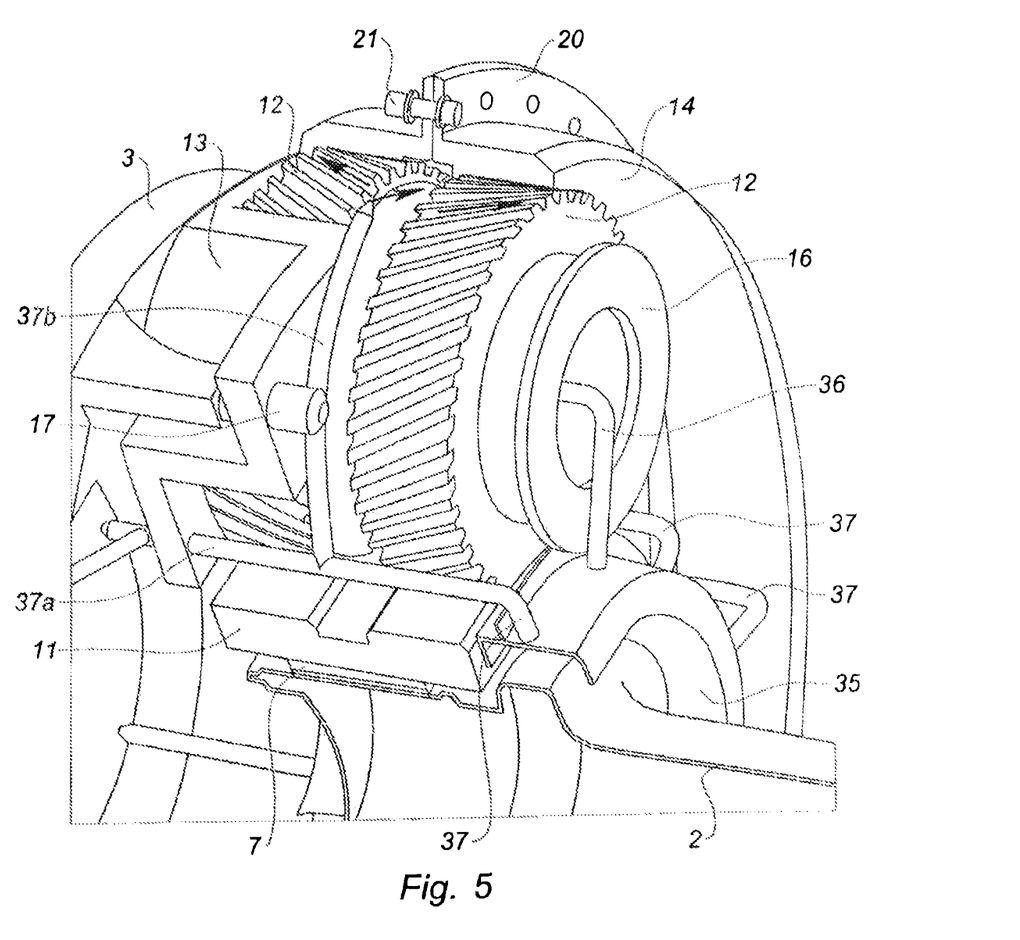
FIG. 5 is a perspective exploded view of the reduction gear of FIG. 4.

FIG. 4 further shows, with FIG. 5, the routing of the lubrication oil to the reduction gear 10 and its path inside said reduction gear. Arrows in FIG. 4 show the path followed by the oil from a specific oil reservoir, referred to as a buffer reservoir 31, as far as the pinions and the bearings to be lubricated.

The buffer reservoir 31 is positioned next to the reduction gear, at the upper portion so that the oil can flow towards the centre of the reduction gear by gravity. This reservoir 31 is supplied by a routing pipe 30, originating from the main reservoir of the engine (not illustrated). The oil flows from the buffer reservoir 31, so as to open in an injector 32 of which the calibrated end narrows to form a nozzle 33. The oil leaves the nozzle in the form of a jet 34 which is formed by the pressure produced by the weight of the column of oil located above it.

This jet 34 is orientated with a radial component which is directed towards the outer side of the engine and terminates with a cylindrical cup 35 which has a U-shaped radial cross-section, the opening of which U is orientated in the direction of the rotation axis 4. When the injector 32 and its nozzle 33 are fixed, the cup 35 can be moved in rotation about the axis 4 and has at all times a U-shaped portion opposite the nozzle. Since opening in the U-shaped bottom of the cup 35 is located opposite the rotation axis 4 and the edges of the U are orientated in the direction of this axis, the cup 35 forms a retention cavity for the oil, which receives the oil from the jet 34. The physical separation which exists between the nozzle 33 and the cup 35 allows decoupling of the reduction gear 10 from the module of the low-pressure compressor and thus affords the possibility of fixing the reduction gear to the fan module. This configuration allows modular mounting of the turbojet engine, without the oil supply circuit interfering during the installation of the fan module on the structural housing 25 or even requiring a specific assembly operation.

The oil is driven in rotation by the cup 35 in the bottom of which it is compressed under the action of the centrifugal force. A series of pipes for supplying oil to the various members to be lubricated extend from the bottom of the cup. These pipes, as illustrated in FIGS. 4 and 5, are basically of two types. A first series of pipes 36 which are distributed in a regular manner over the periphery of the reduction gear and which are equal in number to the number of satellite type planet pinions 12 extend from the bottom of the cup 35 and are introduced into the inner chamber of each planet shaft 16 which is closed by the planet carrier 13. A second series of pipes 37, which are also distributed in a regular manner over the periphery of the reduction gear, extend from the bottom of the cup 35 so as to be directed into the space located between two consecutive satellite type planet pinions 12.

The oil which flows in the first pipes 36 enters the inner cavity of each planet shaft 16 then passes, as a result of centrifugal force, into guiding channels 38, which pass through these shafts and are orientated radially. These channels 38 open at the periphery of the planet shafts 16, in the region of the bearings thereof which support the satellite planet pinions 12 and thus ensure the lubrication of these bearings.

The second pipes 37 extend from the bottom of the cup 35 between the satellite planet pinions 12 and are divided into a plurality of channels 37a, 37b, which convey the oil towards the gear pairs formed, on the one hand, by the pinions of the satellite planet pinions 12 and those of the sun pinion 11 and, on the other hand, the pinions of the satellite planet pinions 12 and those of the ring gear 14. The assembly comprising the bearings and gear pairs of the reduction gear 10 is thus lubricated by the oil which originates from the nozzle 33 and which is collected by the cup 35 opposite. Each second channel 37a extends axially along the satellite type planet pinion 12 between the satellite type planet pinion and the sun pinion 11, and forms a lubrication ramp over the entire width of the two pinions. The channel 37b, which supplies the gear pair between the ring gear 14 and the satellite planet pinions 12, projects its oil at the centre of the cylinder formed by each satellite planet pinion. As illustrated, they are produced in the form of two series of parallel pinions. The tooth arrangement thereof is orientated in a diagonal manner relative to the rotation axis of the satellite planet pinion 12 so that they act as grooves in which the oil is driven from the centre of the cylinder to the periphery thereof, in order to lubricate the gear pair over the entire width thereof.

Figure 6:
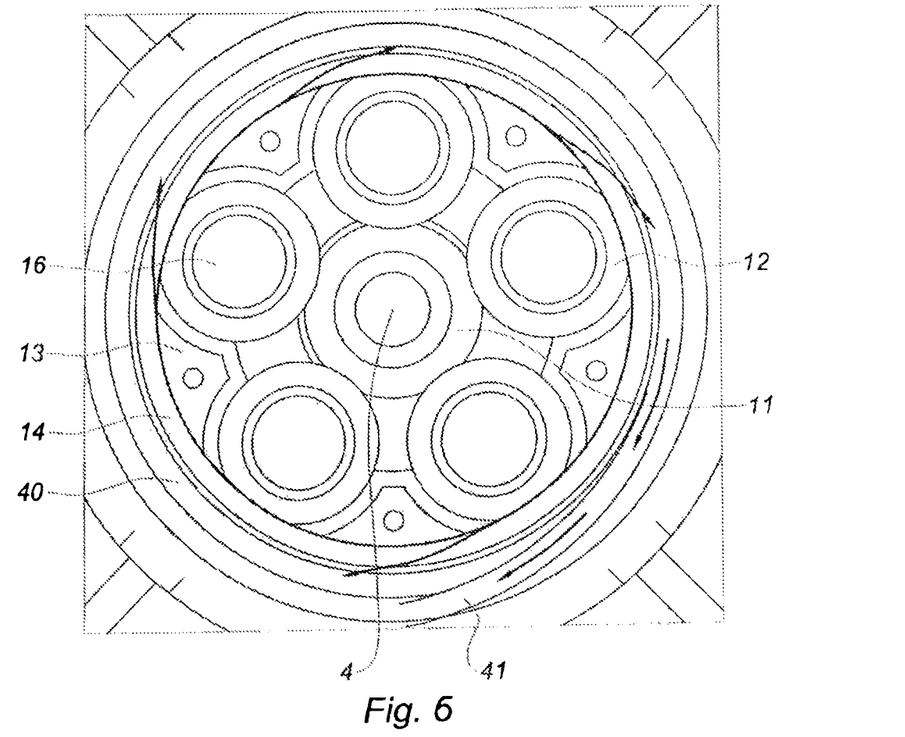
FIG. 6 is a front view of the reduction gear of FIG. 2, provided with a system for recovering lubrication oil, according to an embodiment of the invention.

FIG. 6 is a front view of an epicyclic reduction gear, having a fixed ring gear 14 which is provided with an oil recovery device according to the invention. Around the ring gear 14 there are arranged two symmetrical oil recovery gutters 40 which surround the reduction gear and which terminate at a location of the circumference with two scoops 41 which are turned away from their gutter 40 in order to eject the oil collected and to return it to the main reservoir of the engine.

Figure 7:
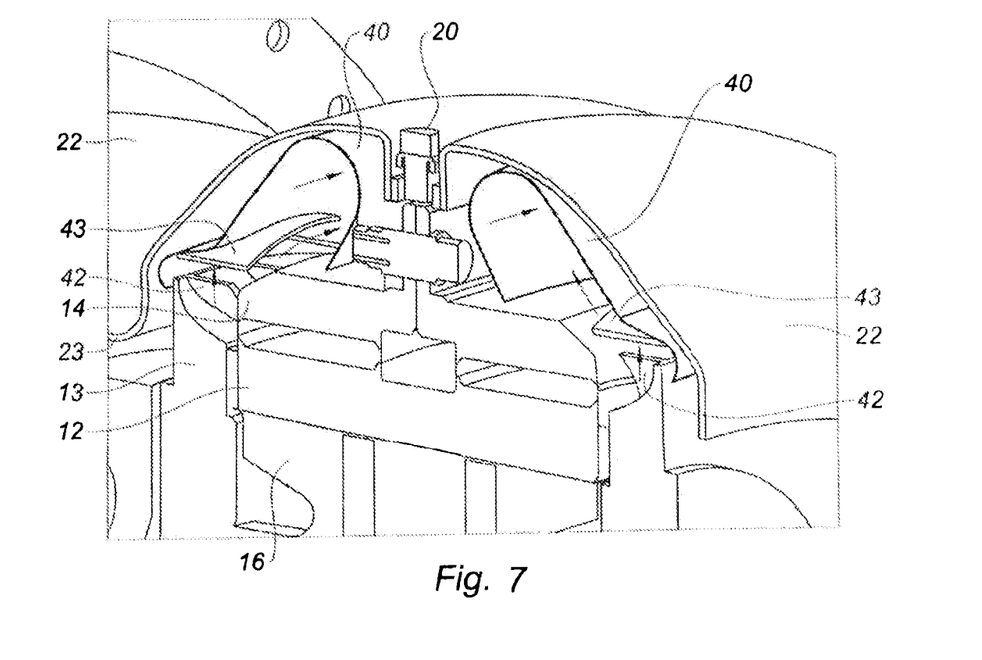
FIG. 7 is an exploded, perspective view of the oil recovery device of the reduction gear of FIG. 6.

FIG. 7 shows the detail of the oil recovery device in the region of the gear pair formed by the pinions of a satellite planet pinion 12 and of the ring gear 14. Around the ring gear 14 there are arranged two symmetrical oil recovery gutters 40 which surround the reduction gear and which terminate at a location of the circumference with two scoops 41 which are turned away from the gutter 40 thereof in order to eject the oil collected which will be recovered in the front lubrication chamber of the engine and which will be returned to the main reservoir of the engine. As indicated above, the oil flows along the teeth of the pinions, and is directed towards the outer side by the pinions of the satellite planet pinion 12 of which the teeth are orientated in an oblique manner. The upper portion of the planet carrier 13 is substantially in the form of a quarter torus which extends axially in a direction away from the upper portion of the satellite planet pinion, below the satellite planet pinion/ring gear pair, then is straightened so as to be orientated radially opposite the ring gear 14. By doing this, it constitutes a receptacle for the droplets of oil projected by the gear pair. Said oil droplets are redirected from the axial direction at the output of the pinions of the satellite planet pinion 12 so as to be reorientated in a radial direction at the end of the quarter torus, from where they are ejected by means of centrifuging. In the region of the outer circumference thereof, the planet carrier 13 carries blades 42 which are located in a regular manner on the circumference thereof and which extend radially so as to be positioned opposite this gear pair. They are arranged inside this quarter torus, substantially in a radial plane of the torus. These blades rotate with the satellite carrier and axially have a curved shape in order to facilitate the ejection, to the outer side of the satellite carrier, of the droplets of oil which escape from the gear pair. However, the rotating blades 42 are curved inwards relative to this radial plane in order to facilitate the detachment and the ejection of the droplets in the plane of the planet carrier 13.

Opposite these rotating blades 42 there are positioned fixed blades 43 which are attached to each gutter 40 in order to form means for collecting the oil and adjusting the flow thereof. They are welded to the gutter 40 in the region of the outer radial end of the planet carrier. These fixed blades are in the form of small inwardly curved plates which are positioned circumferentially at the lower portion of the gutter 40, with an angle of incidence relative to the circle of the lower portion of the gutter. Radially these fixed blades extend sufficiently to cover the entire radial extent of the planet carrier and thus to collect all the droplets of oil which it ejects. These blades allow the flow of oil to be redirected in order to channel it tangentially in the direction of the gutter, so as to maximise the flow speed of this oil.

The two gutters 40 are placed in a symmetrical manner relative to the centre plane of the reduction gear 10 so as to recover the oil which is ejected, both being positioned near the fan shaft 3 and at the opposite side. To this end, the planet carrier 13 comprises on the two faces thereof the same oil ejection device, in the form of a quarter torus which is provided with rotating blades. Each droplet covers, at the outer side, the upper portion of the planet carrier 13 then comprises, approaching the centre plane, a conical surface which is intended to return the oil to the bottom of the gutter. It then continues in the form of a semi-torus of which the bottom forms a channel for the flow of the oil around the reduction gear 10. In the embodiment illustrated in FIG. 7, each gutter finally extends towards the inner side until it returns radially in the region of the ring gear 14, in order to provide protection against the oil being projected on the flanges 20 and the assembly bolts 21.

Figure 8:
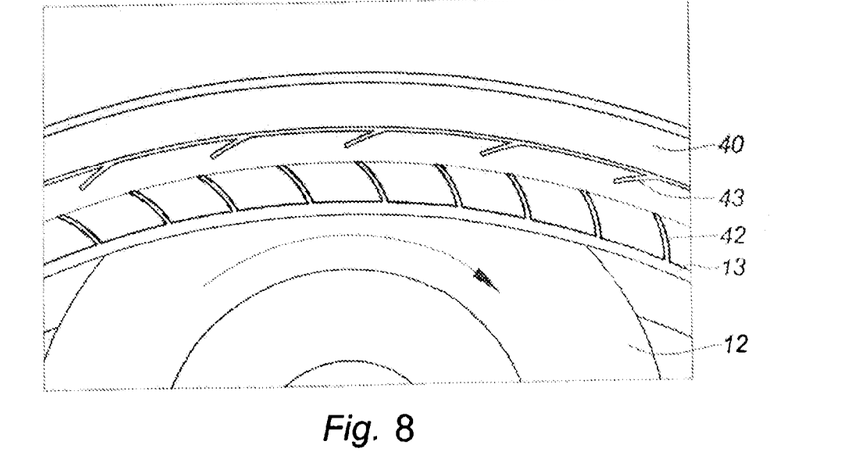
FIG. 8 is a detailed front view of the device of FIG. 7.

FIG. 8 indicates, in radial cross-section, the shape and the relative arrangement of the movable blades 42 and the fixed blades 43. Arrows indicate the path of the oil when it is projected by the planet carrier 13 and recovered by the gutter 40.

Figure 9:
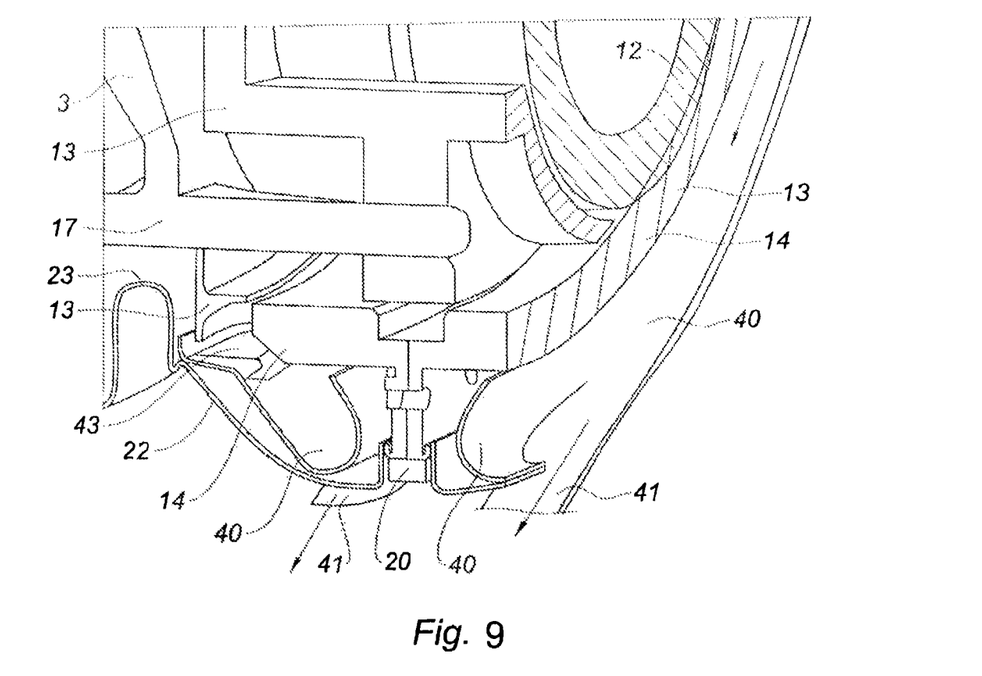
FIG. 9 is a second exploded perspective view of the oil recovery device of the reduction gear of FIG. 6.

Finally, FIG. 9 shows the lower portion of the reduction gear 10 and the oil recovery means thereof. The oil ejected by the planet carrier in the region of each of the gear pairs formed by satellite type planet pinions 12 and the ring gear 14 reaches one of the gutters 40 and is driven in a circular manner in this gutter owing to the inertia thereof. At their low point, the gutters open in a downward direction and comprise an opening in the form of a scoop 41 via which the oil recovered can be removed from the reduction gear 10. This scoop first passes through the support housing 22 then the pressurising housing 24 with which it is in sealed contact in order to benefit from the suction created by a reduced pressure from the outer cavity to this pressurising housing. A device, which is not illustrated, can then return the oil to the main oil reservoir, after optional degassing and passing through a heat exchanger. The absence of a physical connection between the gutters 40 and the structural housing 25 allows assembly of the reduction gear on the fan module without interference with the structure of the turbojet engine and therefore modular assembly of this fan module.

The operation of the lubrication circuit will now be described, firstly for supplying oil to the bearings and gear pairs of the reduction gear and, secondly, for recovering this oil according to the invention, after it has been used.

The oil flows by gravity from the buffer reservoir 31 into the injector 32. Under the pressure of the supply pump and the oil column located above the nozzle 33, the oil is ejected and is recovered by the rotating cup 35 in which it spreads out under the action of the centrifugal force field which is present at that location. It then passes into the first and second pipes 36 and 37 of each satellite planet pinion 12.

The oil which passes through the first pipe 36 is introduced into the inner cavity of the corresponding satellite type planet pinion 12 and is then subjected simultaneously to the preceding field of centrifugal forces and to the field resulting from the rotation of the satellite type planet pinion about the planet shaft 16 thereof. It passes through the thickness of the satellite planet pinion 12 owing to guiding channels 38 of this satellite planet pinion and lubricates the bearing which is located between the satellite planet pinion 12 and the planet shaft 16 thereof. It should be noted that the centrifugal acceleration field results in a pressure gradient along the pipe and this gradient becomes evident in the region of the bearing as a pressure (approximately 5 bar) which is sufficiently high to be able to supply the bearing.

Meanwhile the oil, which passes through the second pipe 37 is divided between the channel 37a for supplying the satellite planet pinion and the channel 37b for supplying the satellite planet pinion/ring gear pair. The channel 37a ejects oil over the entire width of the two pinions owing to its lubrication ramp. The channel 37b returns along the satellite type planet pinion to the region of the meshing thereof on the ring gear 14 and terminates with a nozzle which lubricates it. Preferably, the oil is conveyed to the teeth which extend from the meshing in order to cool said teeth immediately after they have become heated. The oblique orientation given to the teeth of the satellite planet pinion 12 brings about the flow of the oil from the centre of the pinion towards the outer side and therefore ensures a lubrication which is distributed in a homogeneous manner for all of these gears.

All of the bearings and gear pairs of the reduction gear, which are for the most part movable in rotation about the axis of the turbojet engine, are thus lubricated from an oil supply network which is located on the fixed portion of the same turbojet engine and which has no physical connection to the reduction gear.

The recovery of the oil is based principally on the use of the centrifugal force which is applied thereto at the output of the gear pair which is constituted by the pinions of the satellite planet pinion 12. It is ejected axially from this gear pair and falls on the outer radial end of the planet carrier 13. It is recovered by this end in the form of a quarter torus and is directed towards the top of the quarter torus in order to be ejected radially, owing to the rotation speed of the planet carrier 13. It is ejected towards the outer side of the planet carrier by means of centrifugal acceleration, which reaches 1200 g, with a linear speed which is typically approximately 230 km/h. The rotating blades 42, which are optionally mounted at the outer side of the planet carrier 13 in a variant of the invention, act as a centrifugal ejector and facilitate this ejection movement. They thus prevent drops of oil from falling back into the reduction gear 10 and producing the churning action.

The oil is recovered by the fixed blades 43 of the gutters 40 which are located axially opposite the rotating blades. The oil thus arrives tangentially at the conical surfaces of the gutters, which are located opposite the rotating blades 42 of the planet carrier 13. These conical surfaces redirect the oil to the bottom of the gutter 40 and remove the oil from the gear pairs, eliminating any risk of churning. Again in this instance, the presence of blades is optional, and the recovery of the oil can be carried out, in a simplified version, directly on the conical portion of the gutters. However, they have the advantage, being positioned opposite the rotating blades 42, of better directing the stream of oil towards the bottom of the gutter 40.

The oil slides circumferentially on the fixed blades 43, owing to the speed which it has acquired during its rotation on the planet carrier 13, in order to pass into the gutter 40. It is then accommodated in the bottom of this gutter, whilst retaining a circumferential speed, then it describes the portion of the circumference which takes it from the removal location thereof of the planet carrier to the low point of the reduction gear. It is then removed from the reduction gear 10, being redirected by the scoop 41 which extends from the gutter 40 in the direction of the outer side of the reduction gear 10. Via this scoop 41, it passes through the support housing 22 and the pressurising housing 24 so as to arrive back in the outer chamber of the reduction gear, owing to its own speed and the suction created in this outer chamber by the oil pump.

The invention is based principally on the use of the centrifugal force which is generated by the rotation movement of the planet carrier 13 and which allows the oil to be ejected from the vicinity of the pinions. In this manner, the oil does not remain in contact with the pinions and there is no churning action. Since the centrifugal function is ensured by the planet carrier 13, it is particularly efficient owing to the rotation speed thereof and is compatible with a reduction gear of which the ring gear 14 is fixed. The device solves the technical problem posed by evasion of this fixed ring gear, owing to a dual ejection from the pinions of the planet pinion 12 to the planet carrier 13, then from the planet carrier, which can be moved in rotation, to the fixed collector of the gutter 40.

Furthermore, it is also characterised by a dual interruption between the constituent elements of the fan module and the structure of the engine, which allows autonomous assembly of the reduction gear on the fan module and the elimination of the need to connect the oil supply circuit thereof to the adjacent module, after assembling the fan module on the turbojet engine. A first interruption is located between the fixed nozzle 33 and the rotating cup 35 which involves the oil supply circuit, and a second interruption is located in the region of the pressurising housing 24 which provides sealing with the structure of the engine in the region of the O-ring 27 thereof.

The interruption on the oil supply circuit is located downstream of the reduction gear which means that said reduction gear can be fixed to the fan module before this module is assembled on the structure of the turbojet engine, without the need to envisage means for fixing the oil circuit to this reduction gear after the event. In the same manner, the pressurising housing 24 has at the downstream end thereof a means 27 for fixing to the structure of the turbojet engine which can be put into place by means of a simple press-fit action, following a longitudinal translation when the fan module is assembled on said structure.

Again in this instance, the fixing of the fan module to the remainder of the engine requires no assembly operation following the positioning of the fan module.

The invention claimed is:

1. A reduction gear including an epicyclic train, comprising:
   a sun pinion which is movable in rotation about a rotation axis; and
   satellite type planet pinions which are driven by the sun pinion and which are movable in rotation about planet shafts which are carried by a planet carrier, the satellite type planet pinions travelling on a fixed ring gear and the planet carrier being axially positioned laterally relative to the ring gear, a gear pair formed by the satellite type planet pinions and the ring gear being shaped to axially eject lubrication oil thereof after use,
   wherein the planet carrier includes a radial extension that includes a surface which is positioned opposite the gear pair and which guides and redirects the oil, from an axial direction thereof to a radial direction, for ejection by centrifuging at an end thereof, and at least one fixed oil collection gutter that extends radially beyond the planet carrier and is positioned axially opposite the radial extension.

2. The reduction gear according to claim 1, wherein the radial extension is in a form of a partial torus.

3. The reduction gear according to claim 2, wherein the radial extension carries rotating blades which are arranged in a regular manner on a circumference of the planet carrier, extending inside the toms.

4. The reduction gear according to claim 3, wherein the rotating blades are, in radial cross-section with respect to the rotation axis, curved inwards from root to tip in an opposite direction to a rotation direction of the planet carrier.

5. The reduction gear according to claim 4, wherein a portion of the gutter which is located opposite the radial extension is curved.

6. The reduction gear according to claim 5, wherein the curved portion of the gutter carries fixed blades which are distributed in a regular manner over a circumference of the curved portion and which have in radial cross-section, with respect to the rotation axis, an inwardly curved shape which extends in the opposite direction to the rotation direction of the planet carrier.

7. A fan module of a bypass turbojet engine comprising a fan shaft which is driven by the reduction gear according to claim 1.

8. A bypass turbojet engine comprising the fan module according to claim 7.

\* \* \* \* \*